(12) United States Patent
Lazaro et al.

(10) Patent No.: US 7,869,820 B2
(45) Date of Patent: *Jan. 11, 2011

(54) PROVIDING CONTACT DATA IN A WIRELESS TELECOMMUNICATION SYSTEM

(75) Inventors: Frank Lazaro, Decatur, GA (US); Jamie Sims, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1239 days.

This patent is subject to a terminal disclaimer.

(21) Appl. No.: 11/425,405

(22) Filed: Jun. 21, 2006

(65) Prior Publication Data

US 2006/0234736 A1    Oct. 19, 2006

Related U.S. Application Data

(63) Continuation of application No. 10/272,795, filed on Oct. 17, 2002, now Pat. No. 7,116,996.

(51) Int. Cl.
*H04Q 7/20* (2006.01)

(52) U.S. Cl. ............... 455/466; 379/93.25; 379/265.02; 455/419

(58) Field of Classification Search ............... 455/419, 455/466; 379/265.02
See application file for complete search history.

(56) References Cited

U.S. PATENT DOCUMENTS

| | | | |
|---|---|---|---|
| 5,337,347 A | 8/1994 | Halstead-Nussloch et al. | |
| 6,041,229 A | 3/2000 | Turner | |
| 6,064,880 A * | 5/2000 | Alanara | 455/419 |
| 6,597,772 B1 * | 7/2003 | Fleming, III | 379/93.25 |
| 6,879,825 B1 * | 4/2005 | Daly | 455/419 |
| 2003/0235288 A1 * | 12/2003 | McCormack | 379/265.02 |

* cited by examiner

*Primary Examiner*—Phuoc Doan
(74) *Attorney, Agent, or Firm*—Parks IP Law LLC; Jonathan A. Paulis

(57) ABSTRACT

Providing contact data in a wireless telecommunication system comprises receiving a contact data record from a first mobile device and storing the contact data records in a contact database remote from the mobile device. A selection can be received remotely for the contact data record from a second mobile device. The contact data record can be transmitted to the second mobile device for storage in its memory.

18 Claims, 5 Drawing Sheets

PROVIDING CONTACT DATA IN A WIRELESS TELECOMMUNICATION SYSTEM

CROSS REFERENCE TO RELATED APPLICATIONS

This application is a continuation of U.S. application Ser. No. 10/272,795, filed Oct. 17, 2002, now U.S. Pat. No. 7,116,996 the entirety of which is incorporated herein by reference.

FIELD OF THE INVENTION

The invention relates generally to systems and methods for providing contact data in a wireless telecommunication system, and more particularly, to systems and methods for remotely providing contact data to mobile stations in a wireless telecommunication system.

BACKGROUND OF THE INVENTION

The use of telephone products and systems in the day-to-day lives of most people is continually growing. With the advent and steady growth of wireless telecommunications, wireless telecommunication systems will increasingly be utilized for not only voice data, but also for sending and receiving packetized data for use on the Internet, for example. In an effort to lower operating costs and increase value for its subscribers, wireless telecommunication providers wish to remotely provide contact data to mobile stations in the wireless telecommunication system. Wireless telecommunication system subscribers realize a time and a cost savings by remotely receiving contact data at mobile stations in the wireless telecommunication system.

Therefore, the need to efficiently provide contact data in wireless telecommunication systems has become a common need for many wireless telecommunication providers. More specifically, providing contact data to mobile stations in a wireless telecommunication system has become a critical service for many wireless telecommunication providers. This is because in an increasingly competitive environment, meeting and exceeding the expectations of subscribers or others who receive services is essential for a wireless telecommunication provider.

One solution to the contact data problem is for a wireless subscriber to reprogram contact data manually into a mobile station. For example, when a subscriber switches, loses, or has a mobile station stolen, the contact data within the memory of the mobile station remains with the mobile station. When the subscriber replaces the mobile station, contact data must be reprogrammed into a new mobile station. Great inefficiencies are created in this procedure because, for example, the reprogramming process may take place by laboriously typing on the keypad of the new mobile station all the desired contact data. Each time a mobile station is replaced, this process must be repeated. Accordingly, efficiently providing contact data in a wireless telecommunication systems remains an elusive goal.

Thus, there remains a need for efficiently providing contact data in wireless telecommunication systems. In addition, there remains a need for providing contact data to mobile stations in a wireless telecommunication system.

SUMMARY OF THE INVENTION

Consistent with the present invention, methods and systems for providing contact data in a wireless telecommunication system are provided that avoid problems associated with prior methods and systems for providing contact data in a wireless telecommunication system as discussed herein above.

In one aspect, a method for providing contact data in a wireless telecommunication system comprises receiving a selection remotely for a contact data record in a contact database, and transmitting the contact data record to a memory of a mobile station.

In another aspect, a system for providing contact data in a wireless telecommunication system comprises a component for receiving a selection remotely for a contact data record in a contact database, and a component for transmitting the contact data record to a mobile station for storage in a memory.

In yet another aspect, a computer-readable medium on which is stored a set of instructions for providing contact data in a wireless telecommunication system, which when executed perform stages comprising receiving a selection remotely for a contact data record in a contact database using, and transmitting the contact data record to a mobile station for storage in a memory.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
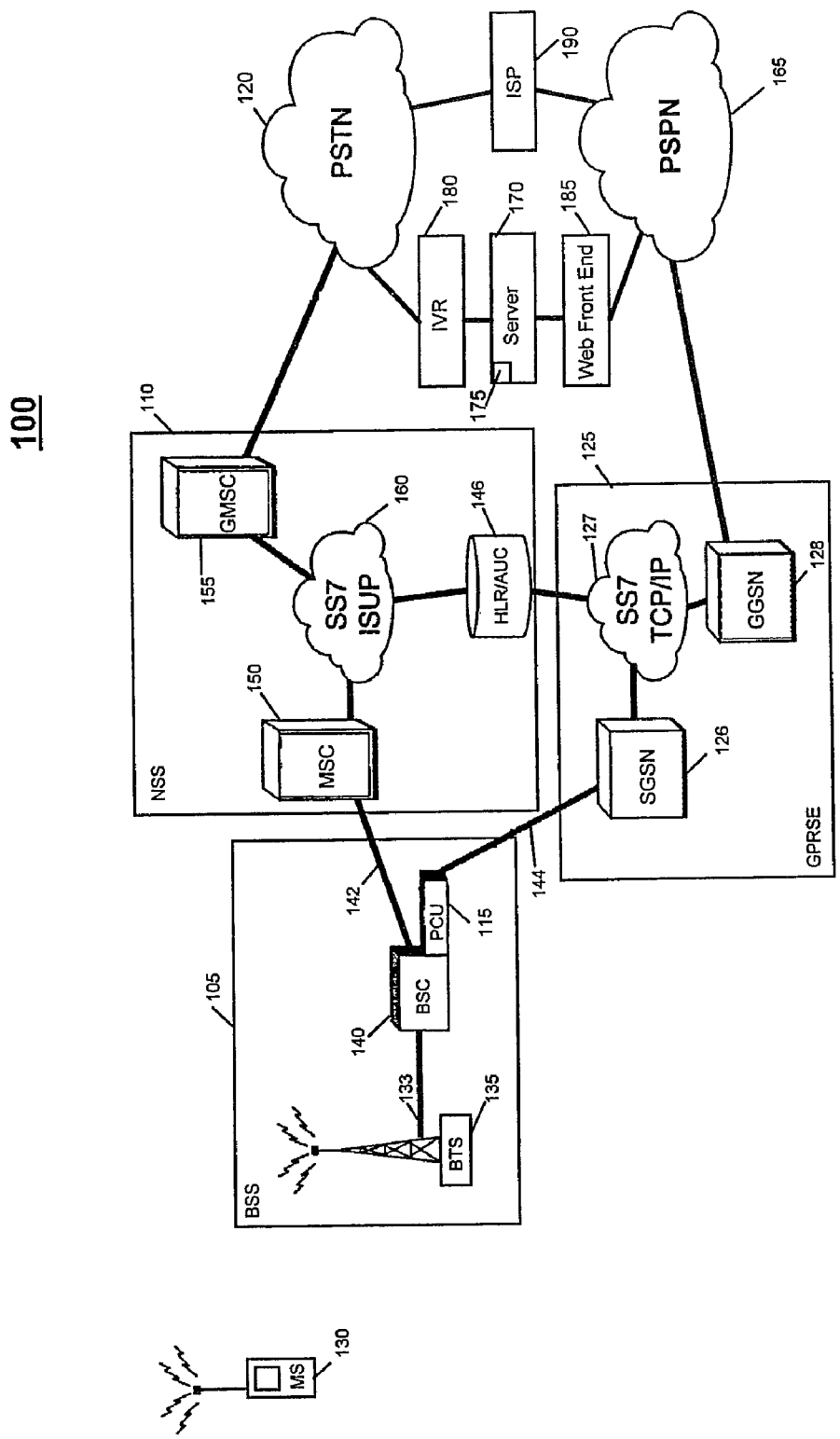
FIG. 1 is a functional block diagram of an exemplary system for providing contact data in a wireless telecommunication system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, a system for providing contact data in a wireless telecommunication system, may comprise a component for receiving a selection remotely for at least one contact data record in a contact database using at least one of an interactive voice response system (IVR), a voice portal, and a short message service, and a component for transferring wirelessly the at least one contact data record into a memory module of a mobile station in the wireless telecommunication system.

As herein embodied and illustrated in FIG. 1, a wireless telecommunication system 100 may comprise a base station subsystem (BSS) 105, a network and switching subsystem (NSS) 110, a mobile station (MS) 130, a publicly switched telephone network (PSTN) 120, a publicly switched packet network (PSPN) 165, a contact data server 170, a contact database 175, an interactive voice response system (IVR) 180, a web front end 185, and an Internet service provider (ISP) 190. The contact data server 170, the contact database 175, the interactive voice response system (IVR) 180, and the web front end 185 may be owned and maintained by an operator of system 100. The elements of system 100 will be described in greater detail below.

Consistent with an embodiment of the invention, the component for receiving a selection remotely and the component for transferring may comprise the contact data server 170 used in conjunction with other elements of system 100. The mobile station may comprise mobile station 130 and the contact database may comprise contact database 175. Those of ordinary skill in the art, however, will appreciate that other elements of system 100 may comprise the component for receiving a selection remotely, the component for transferring, the mobile station, and the contact database. Moreover, while MS 130 may be used to select remotely the at least one contact data record from contact database 175, other elements such as a wire line telephone within PSTN 120 maybe used, as well as other elements as they are known by those of ordinary skill in the art.

System 100 may utilize global system for mobile communications (GSM), technology enhanced with general packet radio service (GPRS) in embodiments of the present invention. GSM, developed in the 1980s and predominantly used in Europe, operate in the 900 MHz and 1.8 GHz bands in Europe and the 1.9 GHz PCS band in the U.S. GSM phones may use a subscriber identity module (SIM) smart card that contains user account information. GSM phones are automatically programmed by plugging in the SIM card, allowing GSM phones to be used interchangeably in situations such as renting or borrowing. In addition, GSM may include short messaging service (SMS) that enables text messages up to 160 characters in length to be exchanged. GSM supports data transfer rates of 9.6 Kbps to packet networks.

GPRS is an enhancement for GSM that supports packetized data. GPRS enables a continuous flow of Internet Protocol data packets over the telecommunication system for applications such as Web browsing and file transfer. GPRS differs from SMS because SMS is limited to messages of 160 bytes in length, GPRS has no such limit. Additionally, those skilled in the art will appreciate that EDGE is an enhancement to the GSM and TDMA wireless telecommunication systems that increases data throughput.

Those of ordinary skill in the art will appreciate that other wireless telecommunication technology standards, in addition to GSM and GPRS, may be employed, for example, FDMA, TDMA, CDMA, CDMA2000, UTMS, and EDGE, without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, bluetooth packet radio, and spread spectrum radio. Wireless data may include, but is not limited to, paging, text messaging, e-mail, Internet access, instant messaging, and other specialized data applications specifically excluding or including voice transmission.

As shown in FIG. 1, BSS 105 may comprise, for example, a base station controller (BSC) 140, a base transceiver station (BTS) 135, and a packet control unit (PCU) 115. BSS 105 connects to MS 130 through a radio interface and connects to NSS 110 through an interface 142. BSC 140 controls BTS 135 and may control a plurality of other base transceiver stations in addition to BTS 135. BTS 135 may comprise radio transmission and reception equipment located at an antenna site. Associated with BSS 105, a transcoder/rate adaptation unit (TRAU) (not shown) may perform speech encoding and speech decoding and rate adaptation for transmitting data. As a subpart of BTS 135, the TRAU may be located away from BTS 135, for example, at a mobile switching center located in NSS 110. When the TRAU is located in this way, the low transmission rate of speech code channels allows more compressed transmission between BTS 135 and the TRAU.

PCU 130 connects BSS 105 to GPRSE 125, which allows, for example, the Internet to link with MS 130. PCU 115 adds level 2 functions of GPRS such as data aware radio link control (RLC) and the MAC protocol layer as well as performing radio resource configuration and channel assignment.

GSM systems may use open system interconnection (OSI). There are several common interfaces defined by OSI such as a common radio interface (referred to as air interface) used between MS 130 and BTS 135, and an A-bis interface 133 used between BTS 135 and BSC 140. With common interfaces such as those defined by OSI, a telecommunication system operator can utilize and interchange equipment of various manufactures when implementing communication systems. The difference between interface and protocol is that an interface represents the point of contact between two adjacent entities (equipment or systems) and a protocol provides information flows through the interface. For example, the GSM radio interface is the transit point for information flow pertaining to several protocols. Interface 142 between NSS 110 and BSS 105 may comprise T-1 lines using X.25 or TCP/IP protocol, for example.

MS 130 may comprise a mobile phone, a personal computer, a handheld computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 130 may utilize cellular telephone protocols such as wireless application protocol (WAP). Such mobile systems may also be configured to permit the user to purchase products through a browser on a display of the mobile device. The invention, as disclosed in this embodiment, in its broadest sense is not limited to a particular form of mobile system or communication protocol. And those of ordinary skill in the art will recognize that other systems and components may be utilized within the scope and spirit of the invention.

MS 130 may be a stand-alone piece of equipment for certain services or support the connection of external terminals, such as the interface for a personal computer or facsimile machine. MS 130 may include mobile equipment (ME) (not shown) or a subscriber identity module (SIM). The ME does not need to be personally assigned to one subscriber. GSM phones, for example, may use a SIM card that contains subscriber account information, as GSM phones may be automatically programmed by plugging in the SIM card. This allows GSM phones to be used interchangeably in situations such as renting or borrowing. When a subscriber's SIM is inserted into the ME of MS 130, all calls for the subscriber are delivered to MS 130. Thus, the ME is not associated with a particular number, but rather, is linked to the subscriber's SIM.

In addition, GSM systems may include short sessaging service (SMS) that enables text messages up to 160 characters in length to be exchanged. SMS is a text message service that enables short messages of generally no more than 140-160 characters in length to be sent and transmitted from mobile stations. SMS was first introduced in the GSM system and later supported by other digital-based mobile communication systems. Unlike paging, short messages are stored and forwarded in SMS centers. SMS messages travel to mobile stations over the wireless telecommunication system's control channels, which are separate and apart from voice channels.

Still referring to FIG. 1, NSS 110 may comprise a mobile switching center (MSC) 150, a first network 160, a home location register/authentication center (HLR/AUC) 146, and a gateway mobile switching center (GMSC) 155. NSS 110 manages the communication between subscribers, for example, an operator using MS 130, and other telecommunication users, for example, those using publicly switched telephone network (PSTN) 120. PSTN 120 may comprise, for example, the worldwide voice telephone network.

MSC 150 coordinates call set-up to and from subscribers using MS 130. MSC 150 may control several base station controllers such as, and similar to BSC 140. GMSC 155 is used to interface with external networks for communication with users outside of the wireless system, such users on PSTN 120.

HLR/AUC 146 may comprise a stand-alone computer without switching capabilities, a database which contains subscriber information, and information related to the subscriber's current location, but not the actual location of the subscriber. The AUC portion of HLR/AUC 146 manages the security data for subscriber authentication. Another sub-division of HLR/AUC 146 may include an equipment identity register (EIR) (not shown), which may store data relating to mobile equipment (ME).

NSS 110 may also include a visitor location register (VLR) (not shown). The VLR links to one or more mobile switching center located on other systems, temporarily storing subscription data of subscribers currently served by MSC 150. The VLR holds more detailed data than HLR/AUC 146. For example, the VLR may hold more current subscriber location information than the location information at HLR/AUC 230.

GMSC 155 is utilized to interface with PSTN 120. In order to set up a requested call, the call is initially routed to GMSC 155, that finds the correct home location register by knowing the director number of the subscriber. GMSC 155 has an interface with an external network, such as PSTN 120, for gatewaying communications.

The elements of NSS 110 are connected using first network 160. First network 160 may comprise an intelligent network utilizing signal system 7 (SS7) in an ISDN user part (ISUP) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control. ISUP defines the protocol and procedures used to set-up, manage, and release trunk circuits that carry voice and data calls over a public switched telephone network. ISUP is used for both ISDN and non-ISDN calls. Calls that originate and terminate at the same switch do not use ISUP signaling.

As shown in FIG. 1, GPRSE 125 may comprise a serving GPRS service node (SGSN) 126, a second network 127, and a gateway GPRS service node (GGSN) 128. In order to implement GPRS, two new node types may be added to a conventional GSM network, GGSN 128 and SGSN 126. Also, the interfaces to the conventional GSM system may be augmented and an extra unit, such as PCU 115 that may be located in BSS 105 as described above, may be added.

SGSN 126 connects GPRSE 125 to BSS 105 through interface 144, which may comprise T-1 lines using X.25 or TCP/IP protocol, for example. SGSN 126 receives the traffic from mobile subscribers associated with BSS 105 and forwards the traffic to GGSN 128. SGSN 126 uses its links with HLR/AUC 146 to authenticate and bill subscribers, and may provide additional services such as data compression, session management and encryption.

GGSN 128 acts as a gateway to PSPN 165, which is most often a publicly switched packet network such as the Internet. Data is sent across the GPRS network to GGSN 128, unencapsulated, and then forwarded to the next node. To the outside world GGSN 128 may appear as just another router on the Internet. Common features of GGSN 128 may include firewall/packet-filtering technologies and a dynamic host configuration protocol (DHCP) server to configure IP options of MS 130 as it logs onto the network. DHCP automatically assigns IP addresses to client stations logging onto a TCP/IP network. It eliminates having to manually assign permanent IP addresses. DHCP software typically runs in servers and is also found in network devices such as ISDN routers and modem routers that allow multiple users access to the Internet.

SGSN 126 and GGSN 128 are connected through second network 127. Second network 127 may employ SS7 as described above and use transmission control protocol/internet protocol (TCP/IP).

PSPN 165 may be accessed by MS 130 through GPRSE 125 in a conventional manner as is know by those of ordinary skill in the art. Likewise, PSTN 120 may be accessed by MS 130 through NSS 110 in a conventional manner as is know by those of ordinary skill in the art. Either through NSS 110 and PSTN 120 or GPRSE 125 and PSPN 165, MS 130 may ultimately access contact data server 170.

Contact data server 170 may comprise a personal computer, a handheld computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information as know by those of ordinary skill in the art. Contact database 175 may be located on storage media in contact data server 170 or other storage media in systems, servers, or components accessible by contact data server 170. Contact database 175 may at least comprise contact data that may include e-mail addresses or telephone numbers. Those of ordinary skill in the art will appreciate, however, that the contact data may include elements other than e-mail addresses or telephone numbers.

Connecting contact data server 170 to PSTN 120 is IVR 180. An IVR is an automated telephone answering system that responds with a voice menu and allows the user to make choices and enter information via the keypad. IVR systems are widely used in call centers as well as a replacement for human operators and may also integrate database access and fax response. Using a dual-tone multifrequency (DTMF) signal such as those generated by a telephone keypad, data may be entered into IVR 180 from a telephone, for example, MS 130 by a DTMF signal passing from MS 130 through BSS 105, NSS 110, PSTN 120, and to IVR 180. From IVR 180, the data may then be pushed onto a LAN, for example, to contact data server 170 and stored in contact database 175 on contact data server 170. As an enhancement to IVR 180, a voice portal (not shown) may be employed. With a voice portal, rather than pressing keys of the DTMF key pad, a user of MS 130 may speak a word or phrase into the microphone of MS 130 in order to make a menu selection.

Connecting contact data server 170 to PSPN 165 is web front end 185. One function of web front end 185 is to provide an Internet interface for contact data server 170. As is known to those skilled in the art, a "web front end" is a computer system that receives hypertext transfer protocol (http) requests from a web browser computer program directed to a specific URL, and provides responses to the requesting computer system that, when processed by the web browser computer program, displays a page of the Internet web site associated with the URL. For example, an exemplary URL employed for the present invention may comprise "http://www.contactdata.com". Directing an Internet-connected computer system with an operative Internet web browser program at this URL causes display of the home page associated with this web site on the computer's display. Such operations are well known to those skilled in the art and will not be discussed further herein.

Rather than using GPRSE 125, MS 130 may connect to contact data server 170 through NSS 110, PSTN 120, Internet service provider (ISP) 190, and then to PSPN 165 and web front end 185. An Internet service provider is an organization that provides access to the Internet, for example, from a publicly switched telephone network. Small Internet service providers provide service via modem and ISDN while the larger ones also offer private line hookups such as T1 lines or fractional T1 lines.

Method for Providing Contact Data

Figure 2:
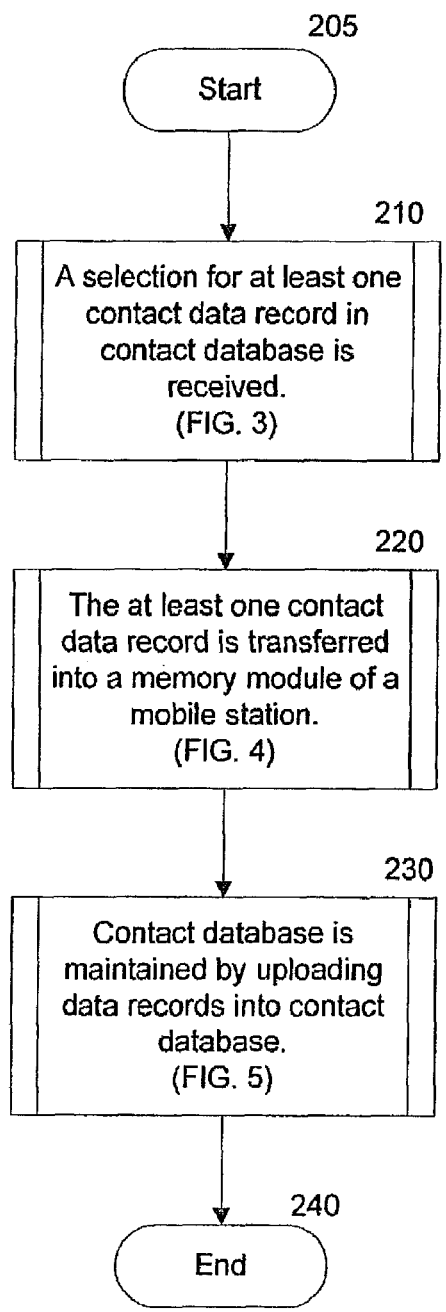
FIG. 2 is a flow chart of an exemplary method for providing contact data in a wireless telecommunication system consistent with an embodiment of the present invention.
Figure 3:
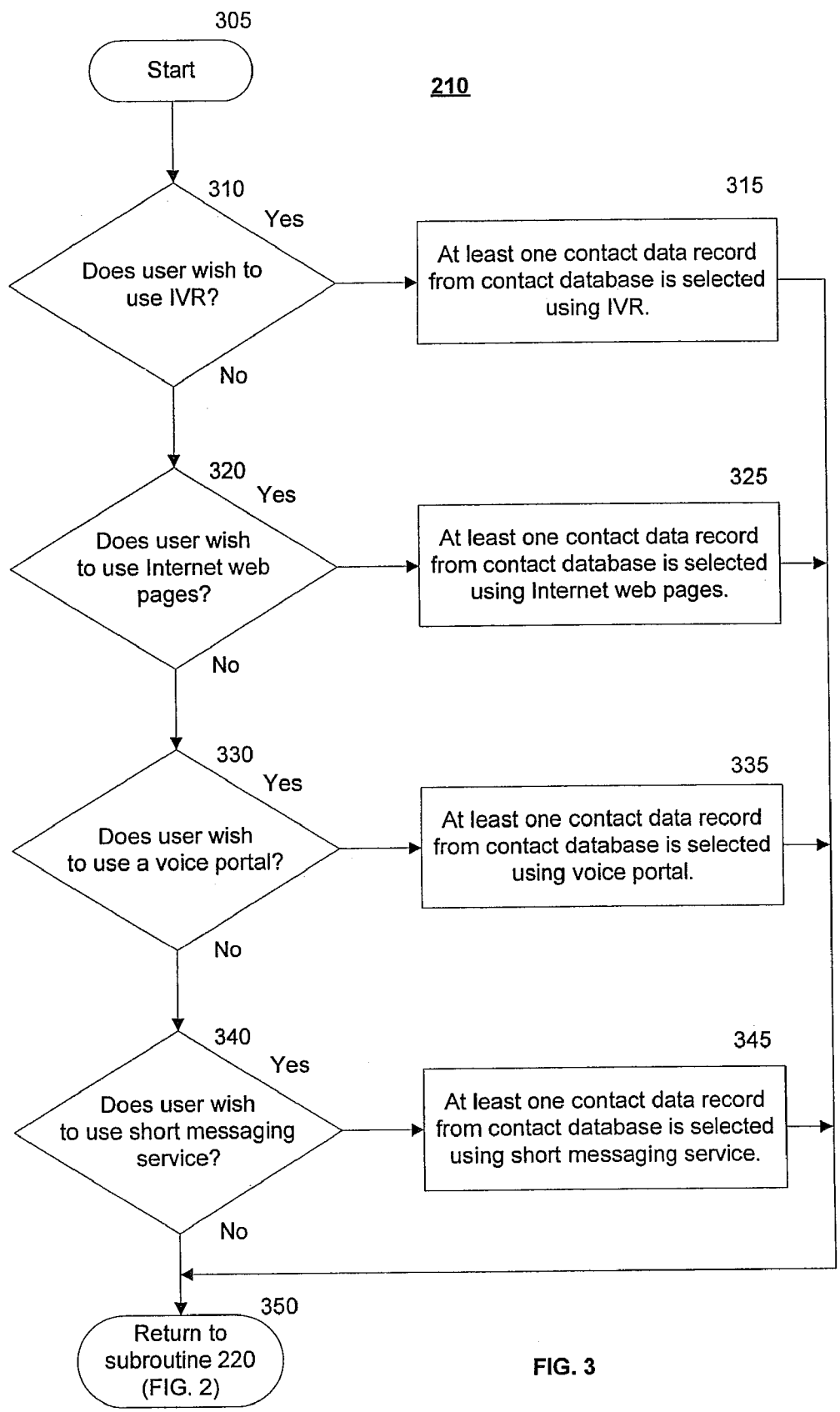
FIG. 3 is a flow chart of an exemplary subroutine used in the exemplary method of FIG. 2 for receiving a selection remotely for at least one contact data record in a contact database consistent with an embodiment of the present invention.

FIG. 2 is a flow chart setting forth the general stages involved in exemplary method for providing contact data in a wireless telecommunication system consistent with an embodiment of the present invention. The implementation of the stages of exemplary method 200 in accordance with an exemplary embodiment of the present invention will be described in greater detail in FIG. 3 through FIG. 5. Exemplary method 200 begins at starting block 205 and proceeds to exemplary subroutine 210 where a selection for at least one contact data record in contact database is received. The stages of exemplary subroutine 210 are shown in FIG. 3 and will be described in greater detail below. From exemplary subroutine 210 where at least one contact data record from contact database is selected, exemplary method 200 continues to exemplary subroutine 220 where the at least one contact data record is transferred into a memory module of a mobile station. The stages of exemplary subroutine 220 are shown in FIG. 5 and will be described in greater detail below. Once the at least one contact data record is transferred into a memory module of a mobile station in exemplary subroutine 220, exemplary method 200 advances to exemplary subroutine 230 where contact database is maintained by uploading data records into contact database. The stages of exemplary subroutine 230 are shown in FIG. 7 and will be described in greater detail below. From exemplary subroutine 230, exemplary method 200 ends at stage 240.

Receiving a Selection Remotely for at Least One Contact Data Record

FIG. 3 describes exemplary subroutine 210 from FIG. 2 for receiving a selection remotely for at least one contact data record in a contact database consistent with an embodiment of the present invention. Exemplary subroutine 210 begins at starting block 305 and advances to decision block 310 where it is determined if a user wishes to use IVR 180. For example, the user may use MS 130 to call IVR 180. Specifically, the user may use MS 130 to call the telephone number in PSTN 120 associated with IVR 180. In doing so, IVR 180 may query the user for a security password in order to determine if the user has authorization to interface with server 170.

If the user wished to use IVR 180 in decision block 310, exemplary subroutine 210 continues to stage 315 where at least one contact data record from contact database 175 is selected using IVR 180. For example, once the user passes security associated with IVR 180, the user may be presented by IVR 180 with an audible menu having at least one option for obtaining contact data. The user may select the at least one option for obtaining contact data by depressing a key on a DTMF key pad of MS 130 as specified by the audible menu.

From decision block 310, if it is determined that the user did not wish to use IVR 180, exemplary subroutine 210 advances to decision block 320 where it is determined if the user wises to use Internet web pages. For example, MS 130 may be configured to send, receive, and manipulate internet web pages utilizing, for example WAP technology. WAP is a standard for providing cellular phones, pagers, and other handheld devices with secure access to e-mail and text-based Web pages. WAP provides an environment for wireless applications that includes a wireless counterpart of TCP/IP and a framework for telephony integration such as call control. In addition, WAP may feature Wireless Markup Language (WML), a streamlined version of HTML for small screen displays.

If the user wished to use Internet web pages in decision block 320, exemplary subroutine 210 continues to stage 325 where at least one contact data record from contact database 175 is selected using Internet web pages. For example, MS 130 may access web front end 185 either through GMSC 155, PSTN 120, ISP 190, and PSPN 165, or through GGSN 128 and PSPN 165. Once web front end 185 is accessed, the user can indicate the desired at least one contact data record in contact database 175 via data passed through the web pages.

From decision block 320, if it is determined that the user did not wish to use Internet web pages, exemplary subroutine 210 advances to decision block 330 where it is determined if the user wishes to use a voice portal. For example, the voice portal may function in much the same way as IVR 180. Specifically, the user may be presented by the voice portal with an audible menu having at least one option for obtaining contact data.

If the user wished to use voice portal in decision block 330, exemplary subroutine 210 continues to stage 335 where at least one contact data record from contact database 175 is selected using the voice portal. For example, rather than receiving data from the DTMF keypad of MS 130 as is the case with IVR 180, for example, the user may select the at least one option for obtaining contact data by speaking a word as specified by an audible menu into the microphone of MS 130.

From decision block 330, if it is determined that the user did not wish to use the voice portal, exemplary subroutine 210 advances to decision block 340 where it is determined if the user wishes to use short messaging service. For example, if a GSM system is used, the system may include short messaging service (SMS) that enables text messages up to 160 characters in length to be exchanged from GSM phones.

If the user wished to use short messaging service in decision block 340, exemplary subroutine 210 continues to stage 345 where at least one contact data record from contact database 175 is selected using short messaging service. For example, SMS messages travel to mobile stations over the wireless telecommunication system's control channels, which are separate and apart from voice channels. Specifically, the user may indicate the desired at least one contact data record from contact database 175 via data passed through SMS messages to server 170.

From decision block 340, if it is determined that the user did not wish to use short messaging service, or from stages 315, 325, 335, or 345 as described above, exemplary subroutine 210 continues to stage 350 and returns to subroutine 220 of FIG. 2.

Transferring Wirelessly the at Least One Contact Data Record

Figure 4:
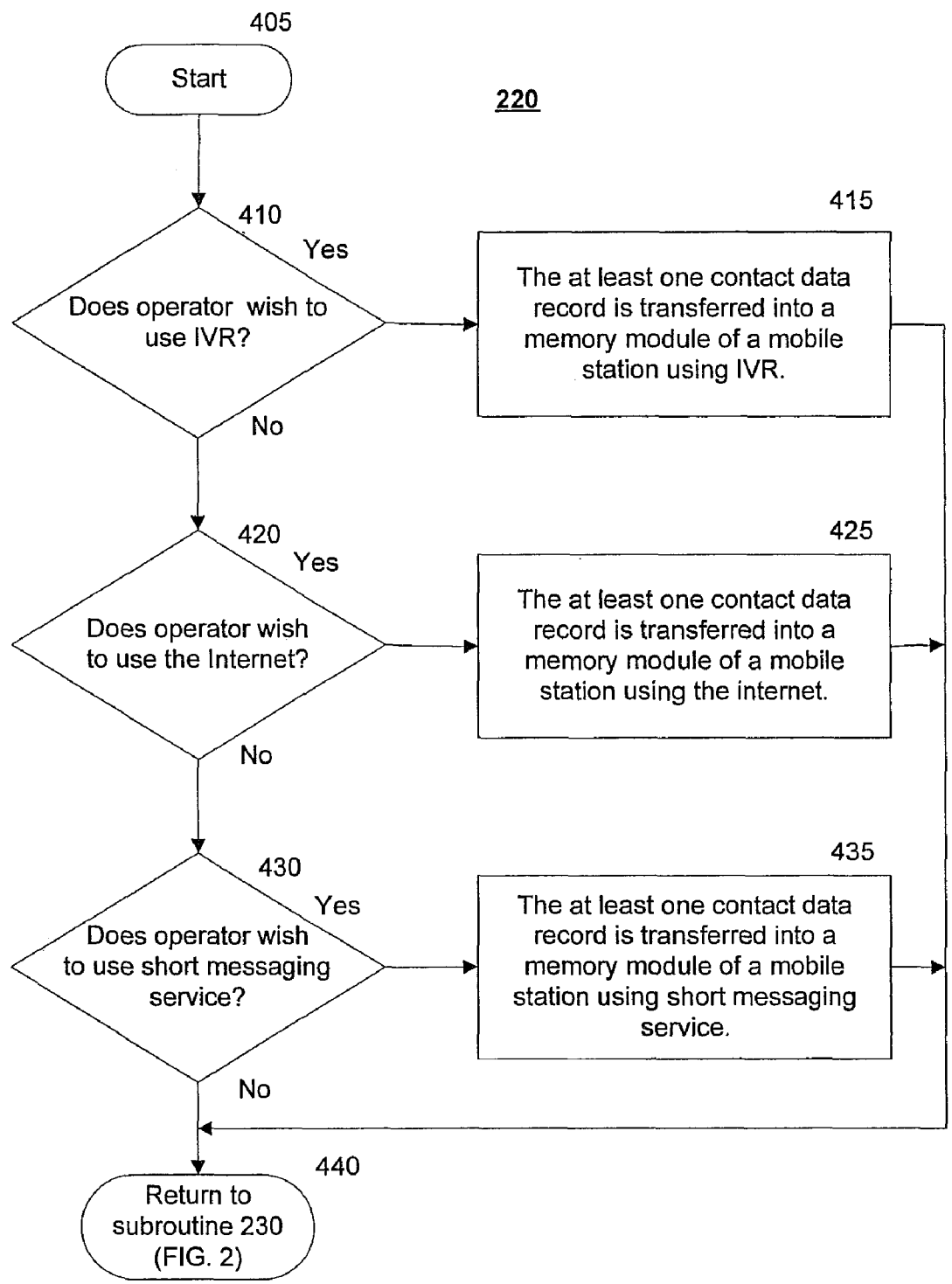
FIG. 4 is a flow chart of an exemplary subroutine used in the exemplary method of FIG. 2 for transferring wirelessly the at least one contact data record into a memory module of a mobile station consistent with an embodiment of the present invention.
Figure 5:
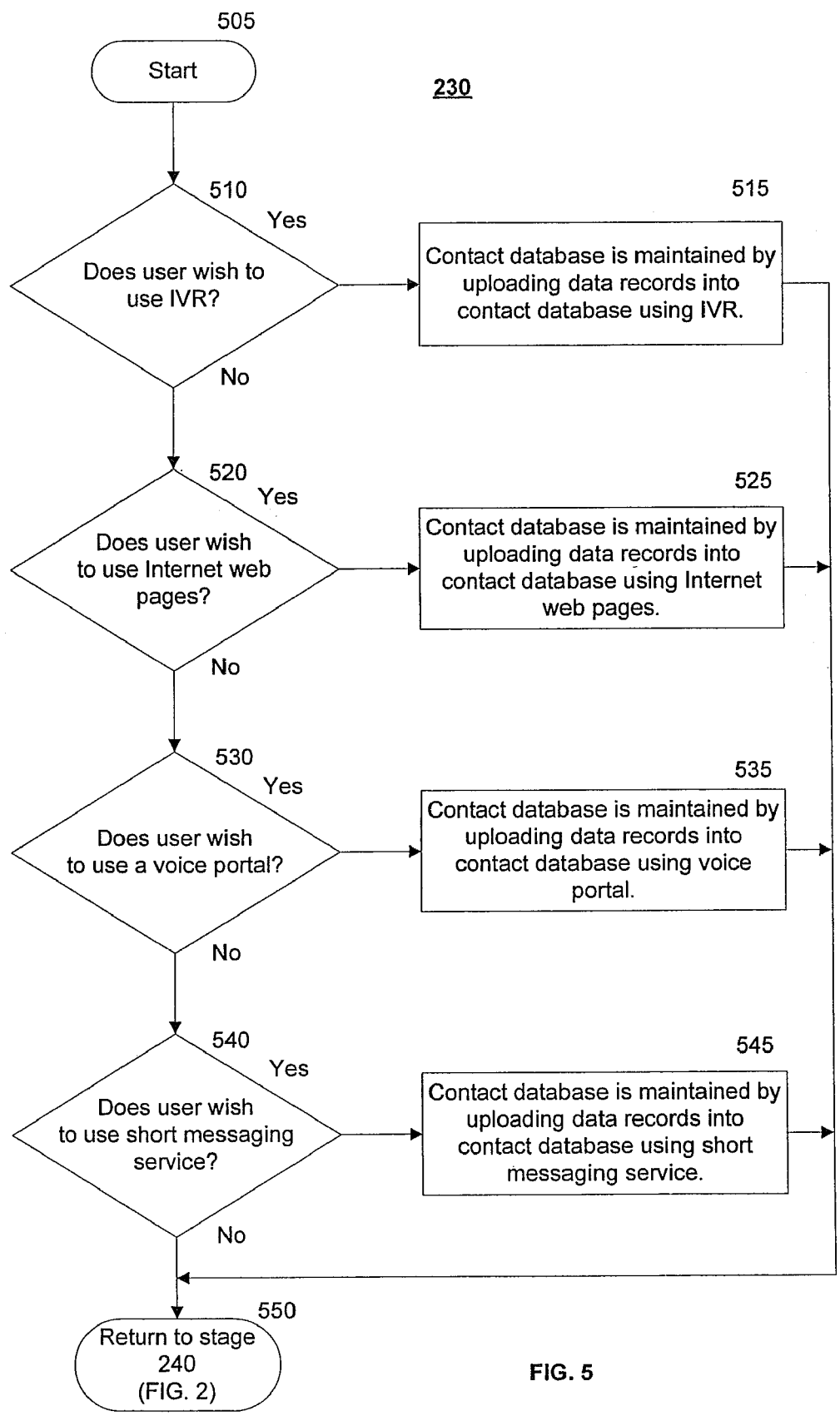
FIG. 5 is a flow chart of an exemplary subroutine used in the exemplary method of FIG. 2 for maintaining a contact database by uploading data records into the contact database consistent with an embodiment of the present invention.

FIG. 4 describes exemplary subroutine 220 from FIG. 2 for transferring wirelessly the at least one contact data record into a memory module of a mobile station consistent with an embodiment of the present invention. Exemplary subroutine 220 begins at starting block 405 and advances to stage 410 where it is determined if the operator wishes to use IVR 180. For example, there are a plurality of paths that the operator of server 170 can use, a path going through IVR 180, PSTN 120, and GMSC 155 being one.

If the operator wished to use IVR 180 in decision block 410, exemplary subroutine 220 continues to stage 415 where the at least one contact data record is transferred into a memory module of mobile station 130 using IVR 180. For example, the operator of server 170 may send the at least one contact data record previously selected to MS 130 through IVR 180 and PSTN 120 to GMSC 155 and ultimately to MS 130. Once the at least one contact data record previously selected arrives at MS 130, it may be stored within memory contained within MS 130.

From decision block 410, if it is determined that the operator did not wish to use IVR 180, exemplary subroutine 220 advances to decision block 420 where it is determined if the operator wishes to use Internet web pages. For example, there are a plurality of paths that the operator of server 170 can use, a path going through web front end 185, PSPN 165, and GGSN 128 being one, and web front end 185, PSPN 165, ISP 190, PSTN 120, and GMSC 155 being another.

If the operator wished to use Internet web pages in decision block 420, exemplary subroutine 220 continues to stage 425 where the at least one contact data record is transferred into the memory module of mobile station 130 using the internet. For example, the operator of server 170 may send the at least one contact data record previously selected to MS 130 through web front end 185 PSPN 165, GGSN 128, and ultimately to MS 130. Or the operator of server 170 may send the at least one contact data record previously selected to MS 130 through web front end 185, PSPN 165, ISP 190, PSTN 120, GMSC 155, and ultimately to MS 130. Once the at least one contact data record previously selected arrives at MS 130, it may be stored within memory contained within MS 130

From decision block 420, if it is determined that the operator did not wish to use Internet web pages, exemplary subroutine 220 advances to decision block 430 where it is determined if the operator wishes to use short messaging service. For example, one of the paths that the operator may wish to use may utilize SMS messages traveling to mobile stations over the wireless telecommunication system's control channels, which are separate and apart from voice channels.

If the operator wished to use short messaging service in decision block 430, exemplary subroutine 220 continues to stage 435 where the at least one contact data record is transferred into the memory module of mobile station 130 using short messaging service. For example, the operator of server 170 may send the at least one contact data record previously selected to MS 130 through the wireless telecommunication system's control channels and ultimately to MS 130 as a SMS message.

From decision block 430, if it is determined that the operator did not wish to use short messaging service, or from stages 415, 425, or 435 as described above, exemplary subroutine 220 continues to stage 440 and returns to subroutine 230 of FIG. 2.

An alternative embodiment may include receiving a selection remotely for the at least one contact data record and transferring wirelessly the at least one contact data record are performed automatically when a subscriber identity module (SIM) is placed in mobile station 130. For example, GSM phones may use a SIM card that contains subscriber account information, as GSM phones may be automatically programmed by plugging in the SIM card. This allows GSM phones to be used interchangeably in situations such as renting or borrowing. When a subscriber's SIM is inserted into the ME of MS 130, all calls for the subscriber are delivered to MS 130. Thus, the ME is not associated with a particular number, but rather, is linked to the subscriber's SIM. Similarly, when a subscriber's SIM is inserted into the ME of MS 130, the at least one contact data record may be automatically selected and may be automatically transferred to MS 130 and stored.

Maintaining Contact Database

FIG. 5 describes exemplary subroutine 230 from FIG. 2 for maintaining contact database by uploading data records into contact database consistent with an embodiment of the present invention. Exemplary subroutine 230 begins at starting block 505 and advances to stage 510 where it is determined if user wishes to use IVR. For example, the user may use MS 130 to call IVR 180. Specifically, the user may use MS 130 to call the telephone number in PSTN 120 associated with IVR 180. In doing so, IVR 180 may query the user for a security password in order to determine if the user has authorization to interface with server 170.

If the user wished to use IVR 180 in decision block 510, exemplary subroutine 230 continues to stage 515 where contact database 175 is maintained by uploading data records into contact database 175 using IVR 180. For example, once the user passes security associated with IVR 180, the user may be presented by IVR 180 with an audible menu having at least one option for obtaining contact data. The user may select the at least one option for uploading contact data by depressing a key on a DTMF key pad of MS 130 as specified by the audible menu.

From decision block 510, if it is determined that the user did not wish to use IVR 180, exemplary subroutine 230 advances to decision block 520 where it is determined if the user wises to use Internet web pages. For example, MS 130 may be configured to send, receive, and manipulate internet web pages utilizing, for example WAP technology. WAP is a standard for providing cellular phones, pagers, and other handheld devices with secure access to e-mail and text-based Web pages. WAP provides an environment for wireless applications that includes a wireless counterpart of TCP/IP and a framework for telephony integration such as call control. In addition, WAP may feature Wireless Markup Language (WML), a streamlined version of HTML for small screen displays.

If the user wished to use Internet web pages in decision block 520, exemplary subroutine 230 continues to stage 525 contact database 175 is maintained by uploading data records into contact database 175 using Internet web pages. For example, MS 130 may access web front end 185 either through GMSC 155, PSTN 120, ISP 190, and PSPN 165, or through GGSN 128 and PSPN 165. Once web front end 185 is accessed, the user can upload contact data records into contact database 175 via data passed through the web pages.

From decision block 520, if it is determined that the user did not wish to use Internet web pages, exemplary subroutine 230 advances to decision block 530 where it is determined if the user wishes to use a voice portal. For example, the voice portal may function in much the same way as IVR 180. Specifically, the user may be presented by the voice portal with an audible menu having at least one option for uploading contact data.

If the user wished to use the voice portal in decision block 530, exemplary subroutine 230 continues to stage 535 where contact database 175 is maintained by uploading data records into contact database 175 using the voice portal. For example, rather than receiving data from the DTMF keypad of MS 130 as is the case with IVR 180, for example, the user may select the at least one option for uploading contact data by speaking a word as specified by an audible menu into the microphone of MS 130.

From decision block 530, if it is determined that the user did not wish to use the voice portal, exemplary subroutine 230 advances to decision block 540 where it is determined if the user wishes to use short messaging service. For example, one of the paths that the operator may wish to use may utilize SMS messages traveling to mobile stations over the wireless telecommunication system's control channels, which are separate and apart from voice channels.

If the user wished to use short messaging service in decision block 540, exemplary subroutine 230 continues to stage 545 where contact database 175 is maintained by uploading data records into contact database 175 using short messaging service. For example, SMS messages travel to mobile stations over the wireless telecommunication system's control channels, which are separate and apart from voice channels. Specifically, the user may upload contact data records into contact database 175 via data passed through SMS messages to server 170.

From decision block 540, if it is determined that the user did not wish to use short messaging service, or from stages 515, 525, 535, or 545 as described above, exemplary subroutine 230 continues to stage 550 and returns to stage 240 of FIG. 2.

It will be appreciated that a system in accordance with an embodiment of the invention can be constructed in whole or in part from special purpose hardware or a general-purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing contact data in a wireless telecommunication system, the method comprising:
   receiving contact information from a first mobile station for a contact data record in a memory of the first mobile station, the contact information being received via a wireless communication link;
   storing the contact data record in a contact database located remotely from the first mobile station;
   receiving a selection from a second mobile station for the contact data record in the contact database; and
   transmitting the contact data record to the second mobile station for storage in a memory of the second mobile station, the contact database located remotely from the second mobile station, the contact data record being transmitted via a wireless communication link;
   wherein receiving the selection from the second mobile station for contact data record and transmitting the contact data record to the second mobile station for storage in the memory of the second mobile station are performed automatically when a subscriber identity module (SIM) is placed in the second mobile station.

2. The method of claim 1, wherein transmitting the contact data record to the second mobile station comprises transmitting the contact data record via a short message service.

3. The method of claim 1, wherein transmitting the contact data record to the second mobile station comprises transmitting the contact data record via the internet.

4. The method of claim 1, wherein the contact data record comprises an e-mail address.

5. The method of claim 1, wherein the contact data record comprises a telephone number.

6. The method of claim 1, wherein the contact database is hosted by a wireless telecommunication system provider.

7. A system for providing contact data in a wireless telecommunication system, the system comprising:
   a first component for receiving a selection from a first mobile station for a contact data record from a memory of the first mobile station;
   a second component for receiving the contact data record and storing the contact data record in a contact database located remotely from the first mobile station, the contact data record being received via a wireless communications link;
   a third component for receiving a selection from a second mobile station for the contact data record from the contact database; and
   a fourth component for transmitting the contact data record to the second mobile station for storage in a memory of the second mobile station, the contact database located remotely from the second mobile station, the contact being transmitted via a wireless communications link;
   wherein the third component for receiving the selection from the second mobile station and the fourth component for transmitting the contact data record to the second mobile station are further configured for performing these functions automatically when a subscriber identity module (SIM) is placed in the second mobile station.

8. The system of claim 7, wherein the fourth component for transmitting the contact data record to the second mobile station is further configured to transmit the data record via a short message service.

9. The system of claim 7, wherein the fourth component for transmitting the contact data record to the second mobile station is further configured to transmit the data record via the internet.

10. The system of claim 7, wherein the contact data record comprises an e-mail address.

11. The system of claim 7, wherein the contact data record comprises a telephone number.

12. The system of claim 7, wherein the contact database is hosted by a wireless telecommunication system provider.

13. A tangible, non-transitory computer-readable medium on which is stored a set of instructions for providing contact data in a wireless telecommunication system, the instructions when executed perform steps of a method, comprising:

receiving a selection from a first mobile station for a contact data record in a memory of the first mobile station;

receiving the contact data record and storing the contact data record in a contact database located remotely from the first mobile station, the contact data record being received via a wireless communications link;

receiving a selection from a second mobile station for the contact data record in the contact database; and transmitting the contact data record to the second mobile station for storage in a memory of the second mobile station, the contact database located remotely from the second mobile station, the contact being transmitted via a wireless communications link;

wherein receiving a selection from the second mobile station for the contact data record and transmitting the contact data record to the second mobile station are performed automatically when a subscriber identity module (SIM) is placed in the second mobile station.

14. The tangible, non-transitory computer-readable medium of claim 13, wherein transmitting the contact data record to the second mobile station comprises transmitting the contact data record via a short message service.

15. The tangible, non-transitory computer-readable medium of claim 13, wherein transmitting the contact data record to the second mobile station comprises transmitting the contact data record via the internet.

16. The tangible, non-transitory computer-readable medium of claim 13, wherein the contact data record comprises an e-mail address.

17. The tangible, non-transitory computer-readable medium of claim 13, wherein the contact data record comprises a telephone number.

18. The tangible, non-transitory computer-readable medium of claim 13, wherein the contact database is hosted by a wireless telecommunication system provider.

* * * * *